United States Patent [19]

Kühl

[11] 4,047,894
[45] Sept. 13, 1977

[54] REMOVING CARBON DIOXIDE FROM THE AIR

[75] Inventor: Dieter Kühl, Bubenreuth, Germany

[73] Assignee: Siemens Aktiengesellschaft, Munich, Germany

[21] Appl. No.: 470,905

[22] Filed: May 17, 1974

[30] Foreign Application Priority Data

May 22, 1973 Germany .............................. 2326070

[51] Int. Cl.² .......................... B01J 1/00; C01B 31/20; H01M 8/06
[52] U.S. Cl. ...................................... 23/284; 55/278; 423/220; 423/230; 423/234; 429/27
[58] Field of Search ............... 23/284, 252 R, 252 US; 423/220, 230, 234; 136/86 A, 86 C; 55/278, 524, DIG. 24; 429/27

[56] References Cited

U.S. PATENT DOCUMENTS

| 2,038,071 | 4/1936 | Wilhelm ........................... 55/316 X |
| 2,973,828 | 3/1961 | Engle .................................... 55/278 |
| 3,490,211 | 1/1970 | Cartier ................................. 55/500 |
| 3,577,710 | 5/1971 | Feldman ......................... 23/284 UX |

FOREIGN PATENT DOCUMENTS

| 2,049,738 | 3/1971 | France ............................... 136/86 A |
| 1,140,635 | 1/1969 | United Kingdom .............. 136/86 A |

Primary Examiner—Joseph Scovronek
Attorney, Agent, or Firm—Kenyon & Kenyon, Reilly, Carr & Chapin

[57] ABSTRACT

An improved method and apparatus for removing carbon dioxide from the air in which the air is passed at a slightly elevated pressure over the surfaces of absorption elements impregnated with a carbon dioxide-absorbing liquid. The elements are corrugated plates, and the air flows transverse to the corrugations.

4 Claims, 1 Drawing Figure

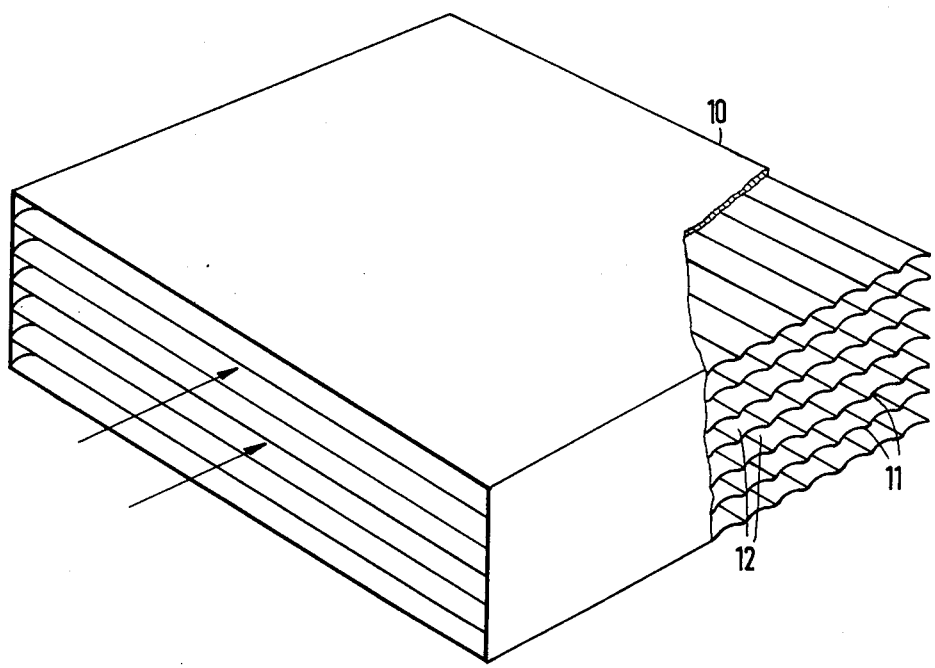

REMOVING CARBON DIOXIDE FROM THE AIR

BACKGROUND OF THE INVENTION

This invention relates to the removing of carbon dioxide from the air in general, and more particularly for an apparatus and method for carrying out such removal, which apparatus and method is particularly useful in removing carbon dioxide from the air used in operating metal-air batteries.

Because of the exhaust emissions of hydrocarbon fuels and also because of their recent shortage, there has been a great deal of interest in electric propulsion for motor vehicles. One of the primary problems associated with such propulsion is in the provision of suitable batteries. One type of battery suggested for such a use which type appears to be quite promising, is a metal-air battery. Because these batteries are operated using an alkaline electrolyte, it is necessary to remove the carbon dioxide from the air used before it is supplied to the air electrodes. Otherwise, the electrolytic liquid would become carbonatized. This, in turn, would result in the impairment or destruction of the metal and air electrodes. Similar problems occur in connection with other types of electrochemical cells which are operated with air such as fuel cells.

Various methods and apparatus have been developed for removing carbon dioxide from the air. In one of these, the air is washed with an alkaline solution in tanks filled with what are referred to as Raschig rings. For the elimination of small amounts of $CO_2$, gel absorbers have also been used. Although these methods are efficient in removing carbon dioxide, they have a serious disadvantage in that the air must be at a fairly high pressure, because relatively high pressure losses occur during the washing process. Furthermore, in order to obtain the increased pressure, compressing means of some nature are required and these means use up a certain amount of energy. This additional energy used in compressing the air can have a particularly unfavorable effect with regard to electro-traction since the energy required for increasing the air pressure would have to be taken from the electrochemical current source being used and this energy would be lost to the main purpose, i.e., the electric propulsion.

Thus, it can be seen that there is a need for an improved method and apparatus for removing carbon dioxide from the air so that the resulting product may be used in the operation of electrochemical cells, which method and apparatus requires only a small increase of air pressure and an accordingly small amount of energy for operation.

SUMMARY OF THE INVENTION

The present invention solves this problem by passing air at a slightly elevated pressure over the surfaces of absorption elements impregnated with a carbon dioxide absorbing liquid. With the method of the present invention, air with a pressure over atmospheric of about 1 to 100 $N/m^2$ (about 0.1 to 10 mm water column) can be used. It is preferred that air with an excess pressure of approximately 10 $N/m^2$ (about 1 mm water column) be used. In the British system, this is equivalent to only about 0.0014 P.S.I.

As compared to the prior art methods of air cleaning requiring large amounts of energy due to the pressure increase or a lowered temperature, the present invention requires only a small amount of energy to bring out the air to the required pressure. The pressure increase noted above refers to the wet scrubbing type of air cleaning whereas systems operating with a lower temperature refers to systems using air liquification in order to purify the air and remove carbon dioxide. On the other hand, with the present invention, carbon dioxide will be removed if the air has only a small excess pressure of, as noted above, about 10 $N/m^2$ (about 0.0014 P.S.I.). As a result, a blower rather than a compressor may be used. This gives a further advantage to the present invention, since it operates at a very low noise level.

In accordance with the method of the present invention, potassium hydroxide solution, in particular 10-molar potassium hydroxide (10 m KOH) can be used to advantage. This concentration of potassium hydroxide exhibits an optimum absorbing action with respect to absorption time.

Disclosed is a device for carrying out the method of the present invention in which the absorption elements comprise porous sintered plates made of polyvinylchloride (PVC) arranged at a spacing from each other. This type of absorption element made of PVC has a high capacity for the absorption liquid, in particular when potassium hydroxide is used as such liquid. It should be noted, however, that the absorption elements can also consist of other materials such as carbon foam.

As compared to prior art devices, the device of the present invention has as an additional advantage, a freedom from clogging. Such clogging can result when using the wet scrubbing method due to the formation of carbonate. Furthermore, the device of the present invention is operational even if the absorbing liquid is dried out, which drying out can happen if the moisture in the air is low.

According to the present invention, a volume porosity of the absorption elements of more than 30% is desired. The size of the pores are selected so that the pores are only large enough so that the absorption liquid adheres well in the porous elements, and only so small that the diffusion processes in the absorption liquid are not affected.

As illustrated, it is particularly advantageous to make the porous PVC plates corrugated with the plates arranged parallel to each other with the peaks and valleys of the corrugations also always in a parallel relationship. With this arrangement, the air is conducted through the spaces between the plates at right angles to the corrugation. A longer reaction time and larger surface area results to give better material transfer between the air and the absorption liquid. The corrugated plates, preferably are arranged at a mutual spacing which corresponds to the plate thickness. With a plate thickness of about 0.5 mm a small, very compact structural unit is obtained.

BRIEF DESCRIPTION OF DRAWINGS

The single FIGURE is a perspective view partially cut away of a device for carrying out the method of the present invention.

DETAILED DESCRIPTION OF THE PREFERRED EMBODIMENT

The device illustrated on the FIGURE comprises a plurality of corrugated PVC plates 11 arranged one on top of the other in parallel relationship within a housing 10. The plates are arranged in a suitable manner with mutual spacing using holders, or the like, so that spaces 12 for the passage of air remain between the plates 11. The housing is closed on the top and bottom and on two sides with the other two sides opened, the front side providing the entrance and the back side the discharge opening for the air from which the carbon dioxide is to be removed.

As an example, corrugated PVC plates with a length of 147 mm, a width of 135 mm and a plate thickness of 0.5 mm are fabricated by sintering PVC powder having a grain size of about 25 to 50 /um at a temperature of about 130 to 170° C and a pressure of about 0.2 to 1 $N/mm^2$ (about 2 to 10 $kg/cm^2$). Preferably, the height of the corrugations will be about 2 mm. Subsequently, the plates having a volume porosity of about 32% are impregnated in a vacuum with the absorption liquid. As noted above, a particularly good absorption liquid is 10 m KOH. The finished plates will have a content of about 0.8 g KOH/g and are then assembled into a housing having a length of 300 mm and a width of 135 mm and a depth of 65 mm, in the manner illustrated on the FIGURE, such that two plates are always in tandem and a multiplicity of such pairs of plates lie on top of each other.

A device of this size and design is well suited for use in an electrically driven motorcycle such as an "Electromofa". In order to obtain a power output of 400 W, approximately 1500 liters of air (3.5-fold excess) are supplied per hour to a metal air battery driving the motorcycle, especially an iron-air battery see Siemens Forschungs- und Entwicklungsberichte Vol. 1, no. 2/72, pages 221 to 226, along with Chemie-Ingenieur-Technik Vol. 45, 1973, No. 4, pages 203 to 206. ) This corresponds to an air throughput of 17 $l/cm^2$ and hour referred to the cross section area of the absorption device. In order to obtain this air throughput, the pressure drop is less than 1 mm water column.

Investigations have shown that with an air throughput of 17 liter/$cm^2$ and hour and a temperature of 0° C after continuous operation for 100 hours, the $CO_2$ absorption is still above 90%. After operation for this period of time, the alkaline solution was approximately 70% spent. Tests carried out at room temperature gave even better results.

Considering a desired travel speed for an electric motorcycle of 25 km/hr, maintenance-free operation for at least 2500 km can be obtained. After traveling this distance, absorption elements can be rinsed out with water, dried and again impregnated with absorption liquid. Tests have also shown that after several repetitions of such regeneration, no decrease in the excellent operating results occurs.

As described herein, the method and apparatus of the present invention can be used to advantage for removing carbon dioxide from air used in the operation of electrochemical cells, such as metal-air batteries. It should be noted however, that the use of the method and apparatus of the present invention is possible wherever relatively small quantities of air must be purified and the amount of energy to be used in such purification must be small. For example, the supply of $CO_2$-free air for use in chemical reactions on a laboratory scale can also be accomplished using the device of the present invention.

Thus, an improved method and apparatus for removing carbon dioxide from the air has been shown. Although specific embodiments have been illustrated and described, it will be obvious to those skilled in the art that various modifications may be made without departing from the spirit of the invention, which is intended to be limited solely by the appended claims.

What is claimed is:

1. Apparatus for removing carbon dioxide from air comprising:
   a. a housing opened on two opposing sides, said opposing sides forming an inlet and outlet for the air from which carbon dioxide is to be removed; and
   b. a plurality of corrugated porous sintered plates of polyvinyl chloride impregnated with a carbon dioxide absorbing liquid supported within said housing in parallel spaced relationship to each other with the peaks and valleys of the corrugations also in parallel relationship to define a plurality of spaces, one between each two adjacent plates which spaces are open between said inlet and outlet, the corrugations extending transverse to the direction of flow of air from said inlet to said outlet, whereby the air is conducted through said spaces from said inlet to said outlet between the plates at right angles to the corrugations to result in a longer reaction time and larger surface area to give better material transfer between the air and absorption liquid without appreciable pressure loss.

2. A device according to claim 1 wherein said carbon dioxide absorbing liquid is potassium hydroxide.

3. A device according to claim 1 wherein the volume porosity of said absorption elements is greater than 30%.

4. A device according to claim 1 wherein said porous sintered plates are arranged at a spacing to each other which is approximately equal to their thickness.

* * * * *